(12) United States Patent
Blanc

(10) Patent No.: US 11,009,735 B2
(45) Date of Patent: May 18, 2021

(54) LIQUID CRYSTAL DISPLAY, IMAGE-GENERATING DEVICE COMPRISING SUCH A DISPLAY AND HEAD-UP DISPLAY COMPRISING SUCH A DEVICE

(71) Applicant: VALEO COMFORT AND DRIVING ASSISTANCE, Créteil (FR)

(72) Inventor: Eric Blanc, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 236 days.

(21) Appl. No.: 16/314,013

(22) PCT Filed: Jun. 30, 2017

(86) PCT No.: PCT/EP2017/066397
§ 371 (c)(1),
(2) Date: Jul. 19, 2019

(87) PCT Pub. No.: WO2018/002373
PCT Pub. Date: Jan. 4, 2018

(65) Prior Publication Data
US 2020/0387026 A1 Dec. 10, 2020

(30) Foreign Application Priority Data
Jun. 30, 2016 (FR) ....................................... 1656244

(51) Int. Cl.
*G09G 3/36* (2006.01)
*G02F 1/1333* (2006.01)
(Continued)

(52) U.S. Cl.
CPC ........ *G02F 1/133385* (2013.01); *B60K 35/00* (2013.01); *G02B 27/0101* (2013.01);
(Continued)

(58) Field of Classification Search
CPC ......... G02F 1/133385; G02F 1/133528; G02F 1/136286; G02F 1/1368; G02F 1/133345; G02F 1/136204; G02F 1/134363; G02F 1/133514; G02F 1/133512; G02F 2202/22; G02F 2201/50; G02F 2201/124;
(Continued)

(56) References Cited

U.S. PATENT DOCUMENTS

| 2006/0104067 A1* | 5/2006 | Hwang | ................. G02F 1/1336 362/373 |
| 2007/0047231 A1* | 3/2007 | Tain | ..................... G02B 6/0028 362/294 |

(Continued)

*Primary Examiner* — Hoan C Nguyen
(74) *Attorney, Agent, or Firm* — Osha Bergman Watanabe & Burton LLP

(57) ABSTRACT

The invention relates to a liquid crystal display comprising a matrix of liquid crystal elements (17), transistors (18), each associated with one of said elements (17) and conductive tracks (19) for connecting to said transistors (18). A heat absorbing device comprises a plurality of longitudinal elements (30; 130, 135; 230, 235; 330, 335), each arranged at right angles with one of said conductive tracks (19). An image-generating device comprising such a display and a head-up display comprising such a device are also described.

15 Claims, 2 Drawing Sheets

(51) Int. Cl.
  *B60K 35/00* (2006.01)
  *G02B 27/01* (2006.01)
  *G02F 1/1335* (2006.01)
  *G02F 1/1362* (2006.01)
  *G02F 1/1368* (2006.01)

(52) U.S. Cl.
  CPC ...... *G02F 1/1368* (2013.01); *G02F 1/133528* (2013.01); *G02F 1/136286* (2013.01); *B60K 2370/1529* (2019.05)

(58) Field of Classification Search
  CPC ......... G02F 2201/123; G02F 2201/121; G02F 2201/133519; G02B 27/01; G02B 27/0101; B60K 35/00; B60K 2370/1529; G09G 3/3696; G09G 2300/0426; G09G 2320/0233
  IPC ..................... G09G 3/3648, 3/3655, 2300/0823, 2300/0866, 2310/0262, 2300/0495, 2300/0434, 3/3611, 2300/0426, 2310/0254, 2300/0876, 2300/0447, 2320/0219, 3/3614, 2330/021, 2300/0465, 2320/028, 3/3696, 2320/0233; G02F 1/134363, 1/134309, 2001/134381, 2201/121, 1/1368, 1/133345, 1/133512, 1/133514, 1/136204, 2202/22, 2201/50, 2201/123, 2201/124, 2001/133519
  See application file for complete search history.

(56) References Cited

U.S. PATENT DOCUMENTS

2007/0291019 A1\* 12/2007 Jung .................... G09G 3/3426
  345/204
2008/0285290 A1\* 11/2008 Ohashi ................ G02B 6/0085
  362/373

\* cited by examiner

LIQUID CRYSTAL DISPLAY, IMAGE-GENERATING DEVICE COMPRISING SUCH A DISPLAY AND HEAD-UP DISPLAY COMPRISING SUCH A DEVICE

TECHNICAL FIELD TO WHICH THE INVENTION RELATES

The present invention relates to display systems.

It more particularly relates to a liquid-crystal display (LCD), to an image-generating device comprising such an LCD and to a head-up display comprising such a device.

The invention particularly advantageously applies in the case where it is desired to obtain a particularly bright image (such as for example in vehicle head-up displays), this leading to notable heating of the LCD.

TECHNOLOGICAL BACKGROUND

The principle of head-up displays for vehicles is to project images, in particular images useful for driving, directly into the field of vision of a driver.

To do this, head-up displays in general comprise an image-generating device suitable for generating images and a device for projecting the images generated, which is able to transmit these images to a semi-transparent plate placed in the field of vision of the driver.

Most of the image-generating devices used at the present time comprise a light source that backlights a liquid-crystal display suitable for generating the images. This LCD absorbs some of the light backlighting it, this causing thermal heating thereof, in particular when the ambient light level makes the projection of a particularly bright image necessary.

However, the temperature of the LCD is critical to good operation thereof, the latter running the risk of being damaged, or even being broken, by too high a temperature. Heating of the display may therefore decrease its lifetime and lead to its replacement.

It is therefore necessary to find solutions aiming, in this context in particular but also in other contexts, to cool such an LCD, or to avoid heating thereof.

SUBJECT OF THE INVENTION

The present invention proposes a liquid-crystal display comprising a matrix array of liquid-crystal elements, transistors each associated with one of said elements and (generally opaque) conductive tracks connecting said transistors, characterized by a heat-absorbing device comprising a plurality of longitudinal elements each placed plumb with one of said conductive tracks.

The LCD thus comprises a heat-absorbing device that allows the LCD to be cooled. By virtue of the arrangement of the longitudinal elements plumb with conductive tracks, the obstruction of the transmission of the light caused by these longitudinal elements is however minimized.

The aforementioned longitudinal elements are for example made of metal (in order in particular to conduct heat or electricity, according to the envisioned embodiment as explained below).

The conductive tracks are for example distributed between a first set of said conductive tracks that extends in a first direction and a second set of said conductive tracks that extends in a second direction perpendicular to the first direction. This structure allows matrix addressing of the transistors and therefore of the liquid-crystal elements.

Provision may for example be made for (all) the longitudinal elements to extend in the first direction.

According to another possibility, a first group of longitudinal elements extends in the first direction whereas a second group of longitudinal elements extends in the second direction. Thus, advantage is taken of the structure of the conductive tracks to use a grid of longitudinal elements, thereby minimizing the hindrance to the passage of light.

In a first embodiment, a plurality of said longitudinal elements is joined to a sheet at at least one of their ends. Such longitudinal elements may thus conduct the heat that they absorb to the sheet, where this heat may be more easily evacuated.

Provision may moreover be made to place the sheet in contact with a heat-dissipating element, such as a heat-dissipating cover of the LCD.

In a second embodiment, at least one longitudinal element is a supply electrode of a thermoelectric cell (for example located within the LCD). The Peltier effect is then used to cool the LCD.

The longitudinal elements may be interposed between a transparent panel and the matrix array of liquid-crystal elements. According to another possibility, the longitudinal elements may be placed in contact with a polarizer. They are in this case for example interposed between the polarizer and a transparent panel, or according to another possibility, placed on an external face of the polarizer. These various possibilities are moreover cumulable.

The aforementioned polarizer may moreover be the entrance polarizer or exit polarizer of the liquid-crystal display.

The invention moreover proposes an image-generating device comprising a liquid-crystal display such as presented above, and a light source placed so as to illuminate the liquid-crystal display.

The invention lastly proposes a head-up display comprising such an image-generating device and an image-projecting device that is suitable for transmitting in the direction of a semi-transparent plate the images generated by the image-generating device.

DETAILED DESCRIPTION OF ONE EXAMPLE EMBODIMENT

The following description, which is given with reference to the appended drawings, which are given by way of nonlimiting example, will facilitate understanding of the invention and how it may be carried out.

In the appended drawings:

FIG. 1 schematically shows the main elements of a head-up display for a vehicle;

In the figures, proportions have not been respected in order to make the structure of the LCDs presented below by way of example more clearly apparent.

Figure 1:
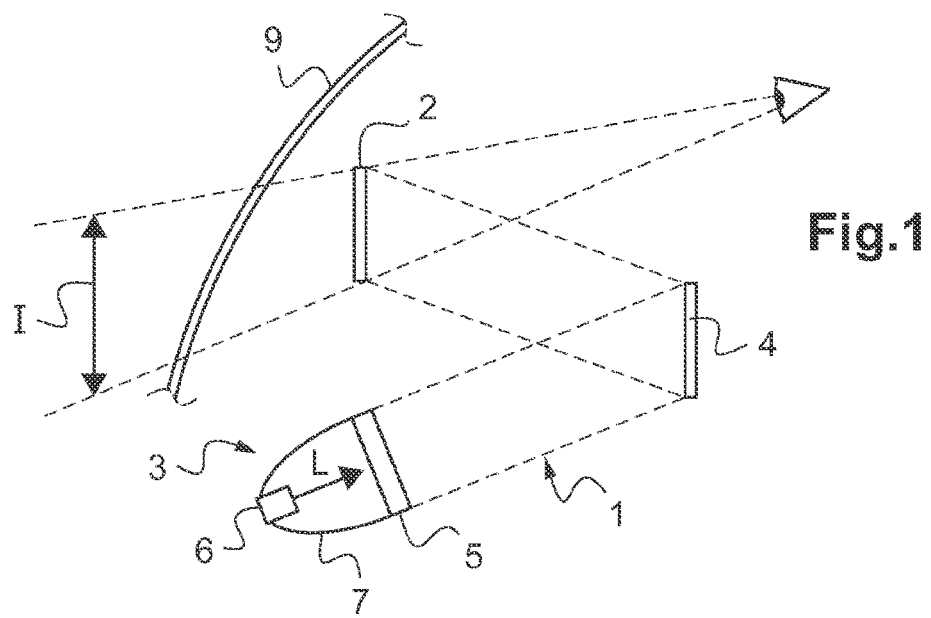

FIG. 1 schematically shows the main elements of a head-up display 1 with which a vehicle, for example a motor vehicle, is intended to be equipped.

Such a display 1 is suitable for creating a virtual image I in the field of vision of a driver of the vehicle, so that the driver is able to see this virtual image I and any information that it contains without having to divert his gaze.

For this purpose, the display 1 comprises a plate 2 that is partially transparent, i.e. what is commonly called a semi-transparent plate 2, and which is placed in the field of vision of the driver, an image-generating device 3 that is suitable for generating images and an image-projecting device 4 that is suitable for steering, in the direction of said semi-transparent plate 2, the images generated by the image-generating device 3.

More precisely, the semi-transparent plate 2 is here a combiner 2, i.e. a semi-transparent plate dedicated to the head-up display 1.

Such a combiner 2 is here placed between the front windshield 9 of the vehicle and the eyes of the driver.

As a variant, the semi-transparent plate could be the front windshield of the vehicle. In other words, in this variant, it is the front windshield of the vehicle that performs the function of the semi-transparent plate for the head-up display.

Moreover, here, the image-projecting device comprises a folding mirror 4 that is arranged so as to reflect the images generated by the image-generating device 3 in the direction of the semi-transparent plate 2. Here, said folding mirror is a planar mirror.

As a variant, the image-projecting device could comprise a plurality of mirrors and/or other optical elements such as a lens for example.

The image-generating device 3 for its part comprises at least one light source 6, a display 5 that is backlit by this light source 6, and a reflector 7. The transmission of the light from the light source 6 to the display 5 has thus been represented schematically by the arrow L in the figures.

The light source 6 comprises at least one light-emitting diode (LED), and in general a plurality of such light-emitting diodes.

As will become clear from the examples given below, the display 5 is a liquid-crystal display (LCD), for example a thin-film-transistor (TFT) LCD.

Figure 2:
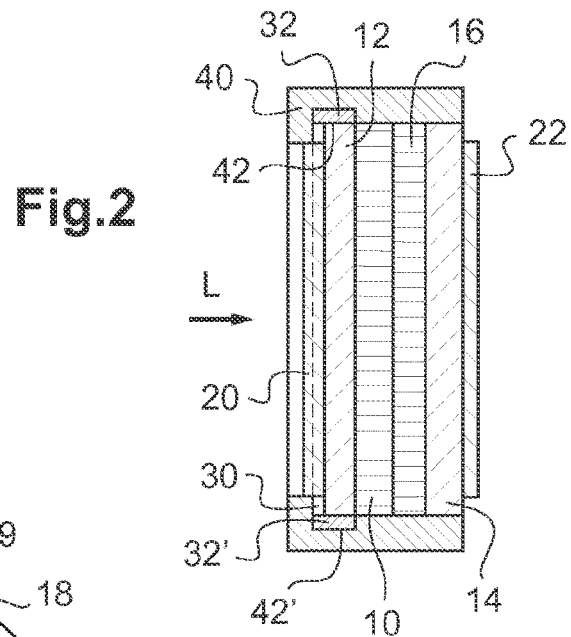
FIG. 2 shows a first example embodiment of an LCD according to the invention.

FIG. 2 shows a first example embodiment of the display 5.

In this first example, the display 5 comprises, in this order in the direction of travel of the light L (i.e. from the portion located on the side of the light source 6 to the side located toward the projecting device 4), sheet-shaped elements (or plates) that follow (each element making contact with the one or more neighboring elements):
- an entrance polarizer 20;
- a first transparent panel 12;
- a matrix array of micro-polarizers 10;
- a matrix array of color elements 16;
- a second transparent panel 14;
- an exit polarizer 22.

Figure 3:
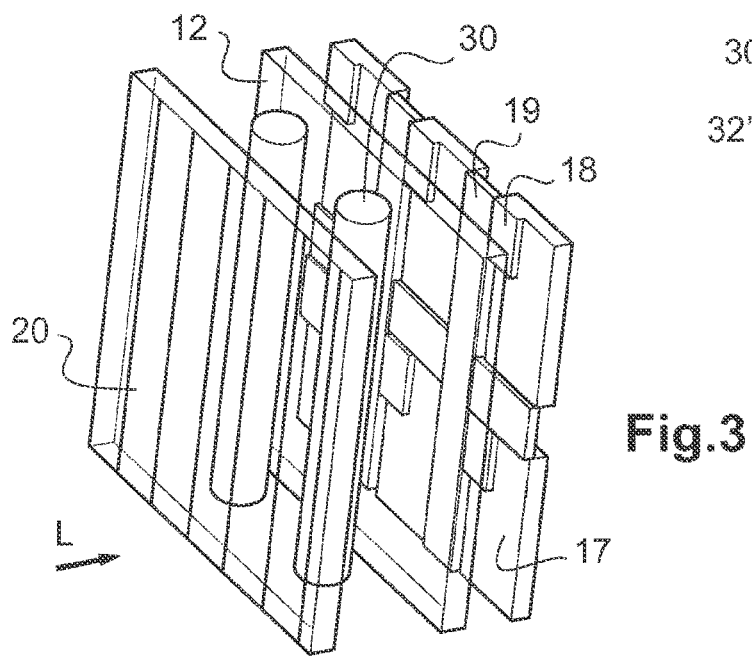
FIG. 3 is an exploded view of one portion of the LCD of FIG. 2.

As may be seen in FIG. 3, the matrix array of micro-polarizers 10 comprises a matrix array of liquid-crystal elements 17, transistors 18 each associated with one of said liquid-crystal elements 17 and conductive tracks 19 connecting said transistors 18.

In order to be able to independently control each of the transistors 18, a first set of conductive tracks 19 extends in a first direction, whereas a second set of conductive tracks 19 extends in a second direction perpendicular to the first direction, each transistor being located at the intersection of a conductive track 19 of the first set and of a conductive track 19 of the second set.

The conductive tracks 19 are in general opaque. However, in a given set, neighboring conductive tracks 19 are spaced apart from each other with interposition of a liquid-crystal element, which element is passed through by light during operation in order to give this light a desired polarization (which is determined depending on the command sent to the associated transistor 18).

The entrance polarizer 20 and the exit polarizer 22 are here filters that polarize by absorption (whereby substantial heating of these polarizers 20, 22). The entrance polarizer 20 and the exit polarizer 22 have a first axis and a second axis that are perpendicular to each other (in the context of the so-called normally-black (NB) technology), respectively. (It will be recalled that the axis of a polarizer is the rectilinear polarization direction of the light beam after passage through the polarizer.)

Thus, if no element of the matrix array of liquid-crystal elements 17 is activated, the light beam between the entrance polarizer 20 and the exit polarizer 22 will be polarized along the first axis (axis of the entrance polarizer 20) and no light will therefore be emitted as output from the exit polarizer 22.

Via suitable activation of the elements of the matrix array of liquid-crystal elements 17 (by means of the transistors 18, which are controlled by a control module (not shown) via the conductive tracks 19), the polarization of certain portions of the light beam is modified level with the matrix-array of liquid-crystal elements 10 so that light is emitted as output from the exit polarizer 22 level with regions corresponding to said portions of the light beam.

For each pixel of the display 5, the matrix array of color elements 16 comprises a plurality of color elements (here a red element, a green element and a blue element) through each of which it is possible to make an adjustable light intensity pass via suitable activation of the corresponding element of the matrix array of liquid-crystal elements 10, as indicated above.

In the present example embodiment, as may be clearly seen in FIG. 3, a set of parallel longitudinal elements 30 that are joined at each of their ends to a sheet 32, 32' has been placed on that face of the first transparent panel 12 which is intended to receive the entrance polarizer 20, before deposition of the entrance polarizer 20.

After deposition of the entrance polarizer 20, the longitudinal elements 30 are located interposed between the entrance polarizer 20 and the first transparent panel 12.

The longitudinal elements 30 are here metal wires (for example wires of copper, aluminum or tungsten), the good thermal conductivity of which allows the heat generated (by absorption of the light) within the entrance polarizer 20 to be evacuated in the direction of the plates 32, 32'.

In another version, the wires may be made of carbon tube.

The sheets 32, 32' are for example made of metal, and optionally made from the same material as the longitudinal elements 30. The sheets 32, 32' are here placed in contact with the edge face of the first transparent panel 12. Provision may moreover be made for the assembly consisting of the sheets 32, 32' and the longitudinal elements 30 to be dimensioned such that this assembly may be mounted on the first transparent panel 12 before deposition of the entrance polarizer 20.

In the embodiment of FIGS. 2 and 3, the longitudinal elements 30 (all) extend parallel to one another, in the direction of extension of one of the two aforementioned sets of conductive tracks 19.

Each longitudinal element 30 is furthermore placed plumb with a conductive track 19 in order to perturb as little as possible the transmission of light through the display 5, and precisely through the liquid-crystal elements 17. The width of the longitudinal elements 30 (i.e. their diameter in the case of wires) is preferably (but not necessarily) smaller than the width of the conductive tracks 19; the longitudinal elements 30 in this case in no way perturb the transmission of the light through the display 5.

Provision may furthermore be made, when the entrance polarizer 20 comprises parallel conductive lines (intended to let pass only one given polarization of the light), for the longitudinal elements 30 to extend in the same direction as the parallel conductive lines of the entrance polarizer 20, as schematically shown in FIG. 3. Thus, disadvantageous interference between these parallel conductive lines and the longitudinal elements 30 is avoided.

The display 5 also comprises a dissipating cover 40, here made of metal, that extends around the perimeter of the display 5, thereby encircling at least some of the sheet-shaped elements 20, 12, 10, 14, 16.

The dissipating cover 40 makes contact with each of the sheets 32, 32' over at least some of the outside area of these sheets 32, 32'. The heat absorbed within the display 5 by the longitudinal elements 30, then conducted by the longitudinal elements 30 to the sheets 32, 32', may thus be evacuated to the dissipating cover 40.

Provision may for example be made, as shown in FIG. 2, for each of the sheets 32, 32' to be received in a housing 42, 42' formed for this purpose in the dissipating cover 40.

In the example just described, the longitudinal elements 30 are securely fastened to the sheets 32, 32', but separate, before assembly, from other parts forming the display 5 (in particular the entrance polarizer 20 and the first transparent panel 12). Provision may be made as a variant for the longitudinal elements 30 to be deposited on the entrance polarizer 20 or on the first transparent panel 12 before assembly.

According to another variant, the longitudinal elements could be interposed between the first transparent panel 12 and the matrix array of micro-polarizers 10 (in order for example to be formed during the manufacturing process of the matrix array of micro-polarizers 10).

Figure 4:
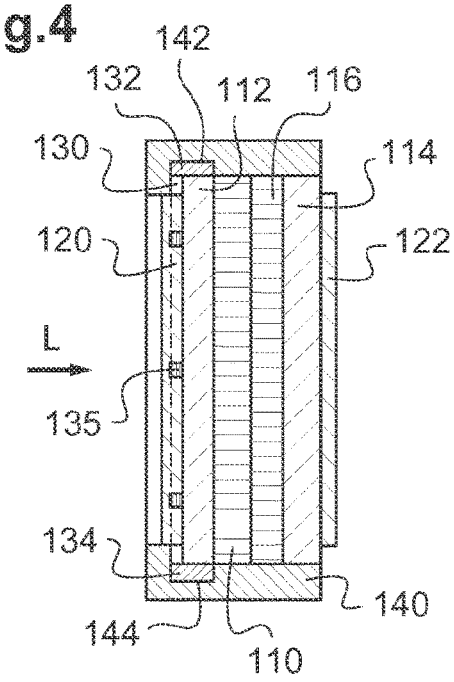
FIG. 4 shows a second example embodiment of an LCD according to the invention.

FIG. 4 shows a second example embodiment of the display 5.

In this second example, the display 5 comprises, in this order in the direction of travel of the light L (i.e. from the portion located on the side of the light source 6 to the side located toward the projecting device 4), the same sheet-shaped elements (or plates) as in the first example described above, namely (each element making contact with the one or more neighboring elements):
- an entrance polarizer 120;
- a first transparent panel 112;
- a matrix array of micro-polarizers 110;
- a matrix array of color elements 116;
- a second transparent panel 114;
- an exit polarizer 122.

The structure of the matrix array of micro-polarizers 110 and the operation of the display 5 are identical to those presented above with reference to FIGS. 2 and 3, and will therefore not be described again.

In the present example embodiment, a set of longitudinal elements 130, 135 that are joined at each of their ends to a sheet 132, 134, 136, 138 has been placed on that face of the first transparent panel 112 which is intended to receive the entrance polarizer 120, before deposition of the entrance polarizer 120.

After deposition of the entrance polarizer 120, the longitudinal elements 130, 135 are located interposed between the entrance polarizer 120 and the first transparent panel 112.

Figure 5:
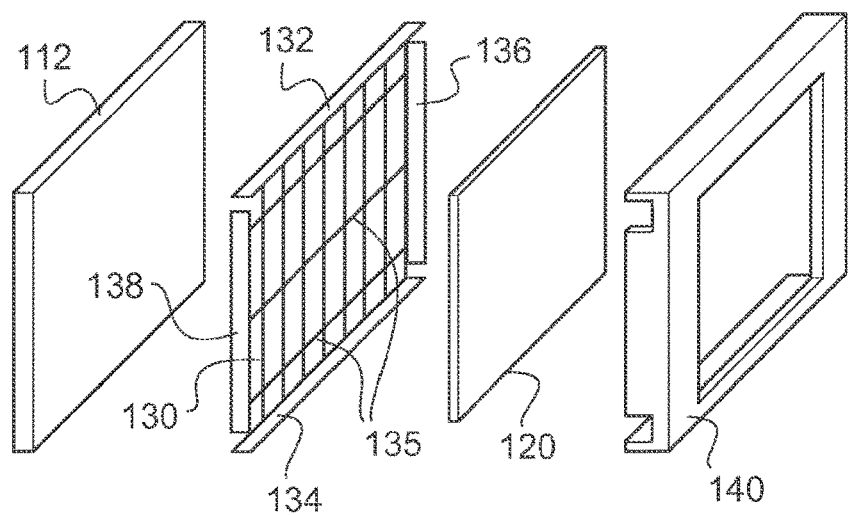
FIG. 5 is an exploded view showing certain parts of the LCD of FIG. 4.

As may clearly be seen in FIG. 5, the longitudinal elements 130, 135 comprise a first group of longitudinal elements 130 that are parallel to one another and oriented in a first direction (vertical in FIG. 5), and a second group of longitudinal elements 135 that are parallel to one another and oriented in a second direction (horizontal in FIG. 5) that is perpendicular to the first direction. The longitudinal elements 130, 135 thus form a grid, which here is interposed between the first transparent panel 112 and the entrance polarizer 120.

Two sheets 132, 134 are joined to the longitudinal elements 130 of the first group (each longitudinal element 130 here being joined to the sheet 132 at one end and to the sheet 134 at its other end); two other sheets 136, 138 are similarly joined to the longitudinal elements 135 of the second group.

The longitudinal elements 130, 135 are here made of metal in order to allow a good evacuation of the heat generated within the display 5. These longitudinal elements 130, 135 may for example be metal wires.

The sheets 132, 134, 136, 138 are for example also made of metal and optionally made from the same material as the longitudinal elements 130, 135. The sheets 132, 134, 136, 148 are here placed in contact with each of the faces of the edge face of the first transparent panel 112. Provision may moreover be made for the assembly consisting of the sheets and longitudinal elements to be dimensioned such that this assembly may be mounted on the first transparent panel 112 before deposition of the entrance polarizer 120.

Each longitudinal element 130, 135 is furthermore placed plumb with a conductive track of the matrix array of micro-polarizers 110 in order to perturb as little as possible the transmission of light through the display 5. The width of the longitudinal elements 130, 135 (i.e. their diameter in the case of wires) is preferably (but not necessarily) smaller than the width of the conductive tracks of the matrix array of micro-polarizers 110; in this case specifically, the longitudinal elements 130, 135 in no way perturb the transmission of the light through the display 5.

The display 5 also comprises a dissipating cover 140, here made of metal, that extends around the perimeter of the display 5, thereby encircling at least some of the sheet-shaped elements 120, 112, 110, 114, 116.

The dissipating cover 140 makes contact with each of the sheets 132, 134, 136, 138 over at least some of the outside area of these sheets 132, 134, 136, 138. The heat absorbed within the display 5 by the longitudinal elements 130, 135 then conducted by the longitudinal elements 130, 135 to the sheets 132, 134, 136, 138, may thus be evacuated to the dissipating cover 40.

Provision may for example be made, as shown in FIG. 4, for each of the sheets 132, 134, 136, 138 to be received in a housing 142, 144 formed for this purpose in the dissipating cover 140.

In the example just described, the longitudinal elements 130, 135 are securely fastened to the sheets 132, 134, 136, 138, but separate, before assembly, from other parts forming the display 5 (in particular the entrance polarizer 120 and the first transparent panel 112). Provision may be made as a variant for the longitudinal elements 130, 135 to be deposited on the entrance polarizer 120 or on the first transparent panel 112 before assembly.

Figure 6:
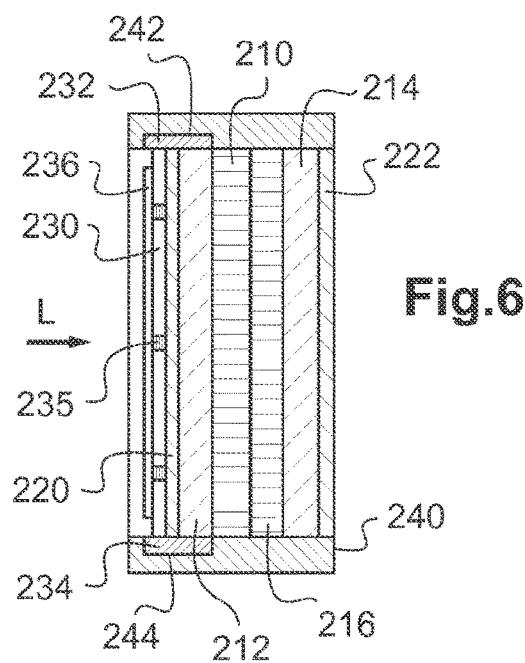
FIG. 6 shows a third example embodiment of an LCD according to the invention.

FIG. 6 shows a third example embodiment of the display 5.

In this third example, the display 5 comprises, in this order in the direction of travel of the light L (i.e. from the portion located on the side of the light source 6 to the side located toward the projecting device 4), the same sheet-shaped elements (or plates) as in the first example described above, namely (each element making contact with the one or more neighboring elements):

- an entrance polarizer 220;
- a first transparent panel 212;
- a matrix array of micro-polarizers 210;
- a matrix array of color elements 216;
- a second transparent panel 214;
- an exit polarizer 222.

The structure of the matrix array of micro-polarizers 210 and the operation of the display 5 are identical to those presented above with reference to FIGS. 2 and 3, and will therefore not be described again.

In the present example embodiment, the exterior face (i.e. here the entrance face) of the entrance polarizer 220 receives a set of longitudinal elements 230, 235 that are joined at each of their ends to a sheet 232, 234, 236.

As in the case of the longitudinal elements 130, 135 that may clearly be seen in FIG. 5, the longitudinal elements 230, 235 comprise a first group of longitudinal elements 230 that are parallel to one another and oriented in a first direction, and a second group of longitudinal elements 235 that are parallel to one another and oriented in a second direction that is perpendicular to the first direction. The longitudinal elements 230, 235 thus form a grid, which here is placed on the entrance polarizer 120.

Two sheets 232, 234 are joined to the longitudinal elements 230 of the first group (each longitudinal element 230 here being joined to the sheet 232 at one end and to the sheet 234 at its other end); two other sheets 236 are similarly joined to the longitudinal elements 235 of the second group.

The longitudinal elements 230, 235 are here made of metal in order to allow a good evacuation of the heat generated in the entrance polarizer 220. These longitudinal elements 230, 235 may for example be metal wires.

The sheets 232, 234, 236 are for example also made of metal and optionally made from the same material as the longitudinal elements 230, 235. The sheets 232, 234, 236 are here placed in contact with each of the faces of the edge face of the entrance polarizer 220 (and furthermore in the example of FIG. 6 extend into contact with each of the faces of the edge face of the first transparent panel 212, respectively). Provision may moreover be made for the assembly consisting of the sheets and longitudinal elements to be dimensioned such that this assembly may be mounted on the entrance polarizer 220 before the entrance polarizer is mounted in the dissipating cover 240 mentioned below.

Each longitudinal element 230, 235 is furthermore placed plumb with a conductive track of the matrix array of micro-polarizers 210 in order to perturb as little as possible the transmission of light through the display 5. The width of the longitudinal elements 230, 235 (i.e. their diameter in the case of wires) is preferably (but not necessarily) smaller than the width of the conductive tracks of the matrix array of micro-polarizers 210; in this case specifically, the longitudinal elements 230, 235 in no way perturb the transmission of the light through the display 5.

The display 5 also comprises a dissipating cover 240, here made of metal, that extends around the perimeter of the display 5, thereby encircling at least some of the sheet-shaped elements 220, 212, 210, 214, 216, 222.

The dissipating cover 240 makes contact with each of the sheets 232, 234, 236 over at least some of the outside area of these sheets 232, 234, 236. The heat absorbed within the display 5 by the longitudinal elements 230, 235 then conducted by the longitudinal elements 230, 235 to the sheets 232, 234, 236, may thus be evacuated to the dissipating cover 240.

Provision may for example be made, as shown in FIG. 6, for each of the sheets 232, 234, 236 to be received in a housing 242, 244 formed for this purpose in the dissipating cover 240.

In the example that has just been described, the longitudinal elements 230, 235 are securely fastened to the sheets 232, 234, 236 with a view to mounting thereof in the display 5, in contact with the entrance polarizer 220. Provision may however be made, as a variant, for the longitudinal elements 230, 235 to be attached directly to the dissipating cover 240 (the sheets 232, 234, 236 then possibly being emitted). In this case, the longitudinal elements 230, 235 are for example produced by means of metal wires of the same type as the bonding wires used in the connection of integrated circuits, these metal wires for example being bonded to the dissipating cover 240 at each of their ends.

Figure 7:
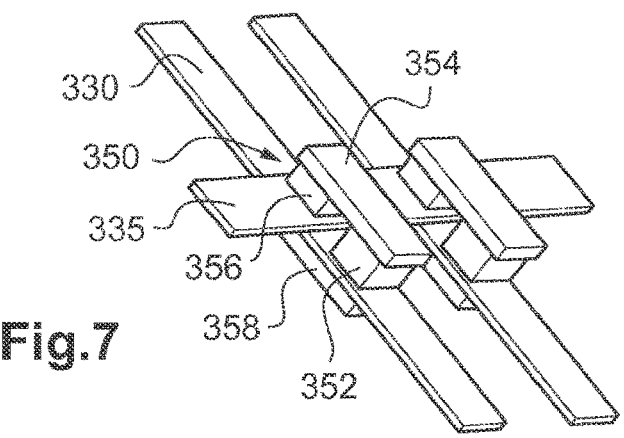
FIG. 7 shows a thermoelectric cell usable in one variant implementation of the invention.

FIG. 7 shows a thermoelectric cell 350 usable in one variant implementation of the invention.

In this variant, the display 5 also comprises longitudinal elements 330, 335, which are here electrodes intended to supply electricity to the thermoelectric cell 350 (also called a "Peltier module", because the Peltier effect is used to produce cooling).

As in the two example embodiments described above, the longitudinal elements (i.e. the electrodes 330, 335) comprise a first group of longitudinal elements (electrodes) 330 that are parallel to one another and oriented in a first direction, and a second group of longitudinal elements (electrodes) 335 that are parallel to one another and oriented in a second direction that is perpendicular to the first direction.

Each electrode 330, 335 is placed plumb with a conductive track of a matrix array of micro-polarizers of the display 5 in order to perturb as little as possible the transmission of the light through the display 5. The width of the electrodes 330, 335 may furthermore be smaller than the width of the conductive tracks of the matrix array of micro-polarizers, thereby making it possible in this case to in no way perturb the transmission of the light through the display 5.

It will be noted that, although this may not be seen in FIG. 7, the electrodes 330 of the first group are (electrically) insulated from the electrodes 335 of the second group (except as regards the connection via the thermoelectric cell 350 as described below).

A thermoelectric cell such as the thermoelectric cell 350 that will now be described is placed at certain at least of the intersections of one electrode 330 of the first group and of one electrode 335 of the second group.

Such a thermoelectric cell 350 comprises a first semiconductor element 352 (for example p-doped), a cold plate 354 and a second semiconductor element 356 (for example n-doped).

In such a thermoelectric cell 350, an electrode 330 of the first group, the first semiconductor element 352, the cold plate 354, the second semiconductor element 356 and an electrode 335 of the second group are connected in series so that they may be passed through by a current that generates cooling of the cold plate 354.

The cold plate 354 is for example placed in contact with the entrance polarizer of the display 5 so as to absorb the heat generated within this entrance polarizer.

The thermally active grid may be included in a transparent polymer film in order to guarantee its mechanical strength.

The thermoelectric cell 350 may furthermore comprise a hot plate 358 (located in contact with at least one electrode, here the electrode 330) which will transmit the heat to the surrounding air.

In the examples described above, the longitudinal elements 30, 130, 135, 230, 235, 330, 335 are placed in contact with the entrance polarizer 20, 120, 220 and are therefore mainly intended to absorb and evacuate the heat generated (by absorption of light) in this entrance polarizer 20, 120, 220. It will however be noted that the invention could be applied in the same way (as a variant or in combination) to the exit polarizer, by fitting longitudinal elements in proximity to (or even in contact with) the exit polarizer.

The invention claimed is:

1. A liquid-crystal display comprising: a matrix array of liquid-crystal elements; transistors each associated with one of said liquid-crystal elements; and conductive tracks connecting said transistors,
    characterized by a heat-absorbing device comprising a plurality of longitudinal elements each placed plumb with one of said conductive tracks.

2. The liquid-crystal display as claimed in claim 1, wherein the conductive tracks are opaque.

3. The liquid-crystal display as claimed in claim 1, wherein the longitudinal elements are made of metal.

4. The liquid-crystal display as claimed in claim 1, wherein a first set of said conductive tracks extends in a first direction and wherein a second set of said conductive tracks extends in a second direction perpendicular to the first direction.

5. The liquid-crystal display as claimed in claim 4, wherein the longitudinal elements extend in the first direction.

6. The liquid-crystal display as claimed in claim 4, wherein a first group of longitudinal elements extends in the first direction and wherein a second group of longitudinal elements extends in the second direction.

7. The liquid-crystal display as claimed in claim 1, wherein a plurality of said longitudinal elements is joined to a sheet at at least one of their ends.

8. The liquid-crystal display as claimed in claim 7, wherein the sheet is placed in contact with a heat-dissipating element.

9. The liquid-crystal display as claimed in claim 8, wherein the dissipating element is a cover.

10. The liquid-crystal display as claimed in claim 1, wherein at least one longitudinal element is a supply electrode of a thermoelectric cell.

11. The liquid-crystal display as claimed in claim 1, wherein the longitudinal elements are interposed between a transparent panel and the matrix array of liquid-crystal elements.

12. The liquid-crystal display as claimed in claim 1, wherein the longitudinal elements are interposed between a polarizer and a transparent panel.

13. The liquid-crystal display as claimed in claim 1, wherein the longitudinal elements are placed on an external face of a polarizer.

14. An image-generating device comprising:
    a liquid-crystal display as claimed in claim 1; and
    a light source placed so as to illuminate the liquid-crystal display.

15. A head-up display comprising:
    an image-generating device as claimed in claim 14; and
    an image-projecting device for transmitting in the direction of a semi-transparent plate the images generated by the image-generating device.

* * * * *